(12) United States Patent
Mahe

(10) Patent No.: US 6,668,034 B2
(45) Date of Patent: Dec. 23, 2003

(54) METHOD OF INSPECTING AN OPERATION OF SEALED CLOSURE BY WELDING THE END OF A FILLING CHANNEL TRAVERSING THE UPPER PLUG OF A NUCLEAR FUEL ROD

(75) Inventor: Philippe Mahe, Montmiral (FR)

(73) Assignee: Societe Franco-Belge de Fabrication de Combustible- FBFC, Courbevoie (FR)

( * ) Notice: Subject to any disclaimer, the term of this patent is extended or adjusted under 35 U.S.C. 154(b) by 0 days.

(21) Appl. No.: 10/203,443

(22) PCT Filed: Feb. 2, 2001

(86) PCT No.: PCT/FR01/00331
§ 371 (c)(1),
(2), (4) Date: Aug. 8, 2002

(87) PCT Pub. No.: WO01/61707
PCT Pub. Date: Aug. 23, 2001

(65) Prior Publication Data
US 2003/0012326 A1 Jan. 16, 2003

(30) Foreign Application Priority Data
Feb. 15, 2000 (FR) ............................................. 00 01859

(51) Int. Cl.$^7$ .......................... G21C 3/10; G21C 17/06; G21C 21/02

(52) U.S. Cl. ...................... 376/248; 376/258; 376/261; 376/451; 219/121.64; 219/121.85; 700/109; 382/141; 382/152

(58) Field of Search ................................ 376/245, 248, 376/261, 258, 451; 219/121.64, 121.85; 700/109; 382/141, 152

(56) References Cited

U.S. PATENT DOCUMENTS

| | | | |
|---|---|---|---|
| 4,554,128 A | | 11/1985 | Parker et al. |
| 5,108,693 A | * | 4/1992 | Landry et al. ............... 376/245 |
| 5,192,846 A | | 3/1993 | Duthoo |
| 5,375,756 A | * | 12/1994 | Haughton et al. ........... 376/261 |
| 5,379,329 A | * | 1/1995 | Yaginuma et al. ........... 376/248 |
| 5,517,420 A | | 5/1996 | Kinsman et al. |
| 5,554,837 A | * | 9/1996 | Goodwater et al. .... 219/121.64 |
| 5,572,102 A | | 11/1996 | Goodfellow et al. |
| 5,602,885 A | | 2/1997 | Ahmed et al. |
| 5,748,691 A | * | 5/1998 | Harmon et al. ............. 376/261 |
| 5,923,555 A | | 7/1999 | Bailey et al. |
| 5,958,267 A | | 9/1999 | Lingenfelter et al. |

FOREIGN PATENT DOCUMENTS

WO        01 22428        3/2001

* cited by examiner

*Primary Examiner*—Harvey E. Behrend
(74) *Attorney, Agent, or Firm*—Kenyon & Kenyon

(57) ABSTRACT

A method of inspecting an operation of sealed closure by welding an end opening of a filling channel axially traversing an upper plug for closing the cladding of a fuel rod for a nuclear reactor, the cladding of the rod containing a plurality of pellets of nuclear fuel stacked in the axial direction of the cladding and two closure plugs, one of the plugs or the upper plug being traversed axially by the channel for filling the cladding of the rod with an inert gas and the sealed closure by welding of the filling channel of the upper plug being carried out after filling the cladding with inert gas, in a filling apparatus, by melting central part of the end of the upper plug adjacent to the opening of the filling channel, this method allowing for inspection of the conditions for implementing and carrying out the sealed closure of the upper plug by welding, efficiently and without extending the time needed for the manufacture of the fuel rod.

8 Claims, 9 Drawing Sheets

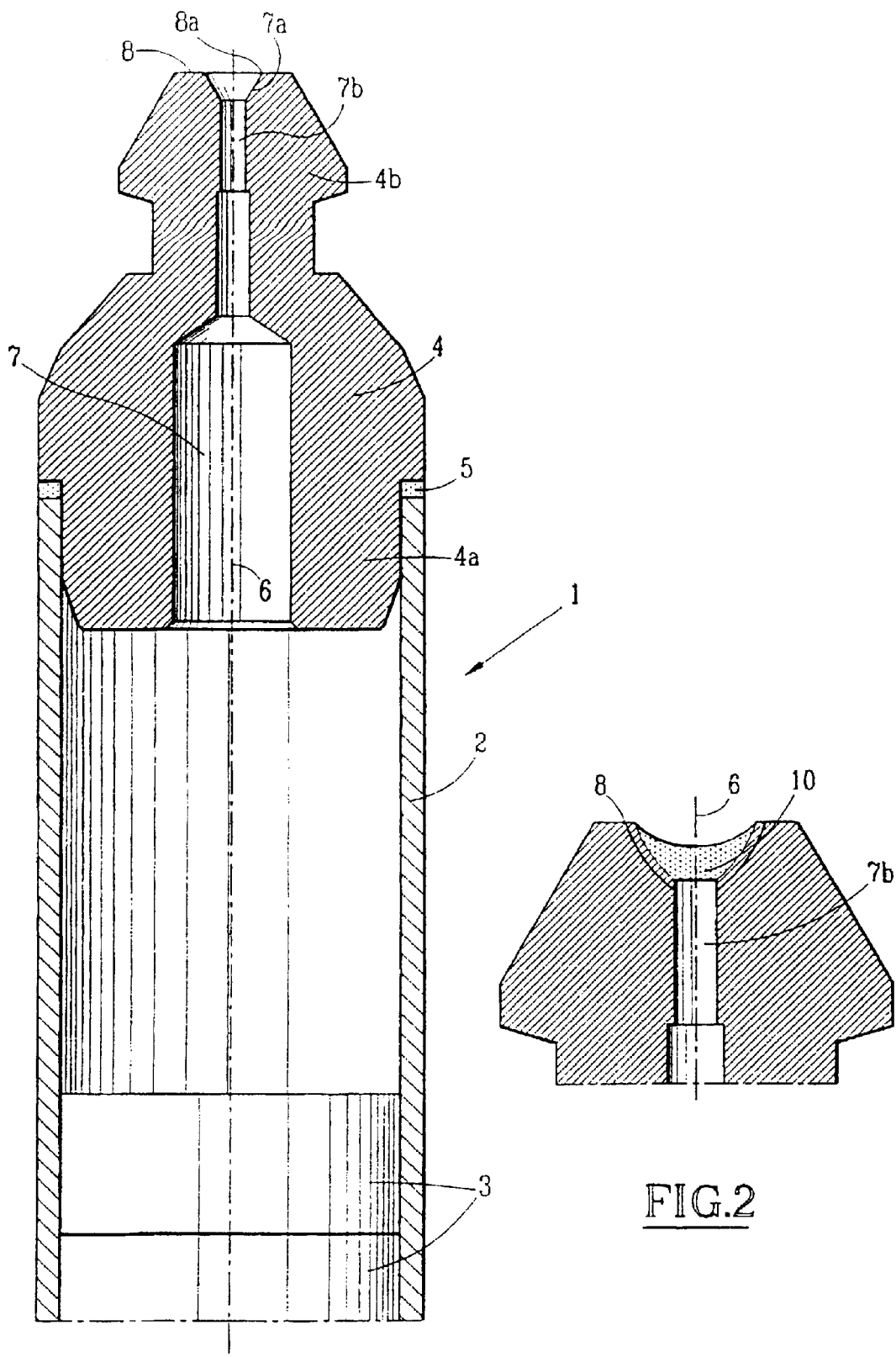

Position: 0.0274 mm
Diameter: 1.3260 mm

COMPLIANT

Position 0.4052 mm
Diameter: 1,3260 mm

NONCOMPLIANT

Position: 0.0505 mm
Diameter: 0.8840 mm
NONCOMPLIANT
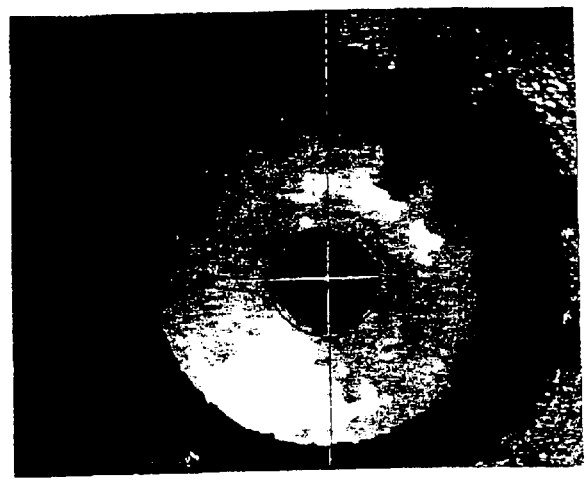
FIG.8
FIG.9
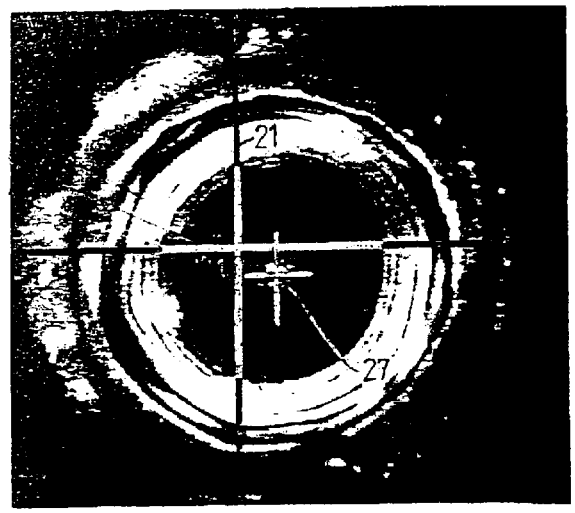

Position: 0.0123 mm
Diameter: 0.11387 mm

COMPLIANT

Position: 0.2342 mm
Diameter: 0.1387 mm

NON COMPLIANT

NONCOMPLIANT

METHOD OF INSPECTING AN OPERATION OF SEALED CLOSURE BY WELDING THE END OF A FILLING CHANNEL TRAVERSING THE UPPER PLUG OF A NUCLEAR FUEL ROD

FIELD OF THE INVENTION

The present invention relates to a method of inspecting an operation of sealed closure by welding the end of a filling channel traversing the upper plug of a nuclear fuel rod.

BACKGROUND INFORMATION

Nuclear reactors, such as nuclear reactors cooled by pressurized water, comprise a core consisting of fuel assemblies in which energy in the form of heat is produced during operation of the reactor.

Each of the fuel assemblies generally consists of a bundle of mutually parallel fuel rods held in a framework of the fuel assembly. Each of the fuel rods comprises a tubular padding made of a material which weakly absorbs neutrons such as a zirconium alloy, in which nuclear fuel pellets are stacked, for example sintered pellets of $UO_2$ uranium. The tubular cladding is closed at its ends by plugs, each of which comprises a cylindrical part which is engaged coaxially in an end part of the cladding. The plug and the cladding are then fastened one to the other by welding around a circular line located in a plane which is substantially perpendicular to the axis of the cladding and of the plug.

One of the two plugs for closing the cladding of a fuel rod, which is called the upper plug, because it closes the upper end of the rod inside the fuel assembly in the service position of the fuel assembly in the core of the nuclear reactor, is traversed axially by a channel, wherein the cladding of the rod is filled, around the nuclear fuel pellets, by an inert pressurized gas such as helium which protects the fuel pellets against oxidation and promotes heat exchange between the pellets and the cladding of the rod when the rod is in service in the core of the nuclear reactor.

The manufacture of the fuel rods requires numerous successive operations in order to fill the cladding with the fuel pellets, to place and weld the plugs and to introduce an inert pressurized gas such as helium into the cladding sealed shut by the plugs, and to close the filling channel of the plug, after filling. Numerous inspections must be carried out at all steps of the fuel rod manufacture, so as to attain fuel rods which are completely free of defects.

In particular, sealing the closure by welding the filling channel of the upper plugs must be subject to rigorous inspection.

The filling with pressurized helium of the cladding of the rods containing the fuel pellets and sealed shut by the plugs is carried out in a filling apparatus in which the upper end part of the fuel rod, comprising the upper plug traversed axially by the filling channel, is inserted. The end of the upper plug, on which the filling channel emerges in the form a circular inlet opening extended axially by a chamfered part of the filling channel, is placed so as to be able to engage with a valve for closing and opening the chamfered end part of the filling channel. In the open position of the valve, the air contained inside the fuel cladding is evacuated, then the rod is filled by pressurized helium entering inside the cladding via the filling channel of the upper plug. Finally, in the filling apparatus, the end of the filling channel is sealed shut by a weld obtained by melting a central part of the plug adjacent to the end part of the filling channel. Generally, the material of the plug is melted to carry out the weld under the effect of a laser beam directed axially on the chamfered inlet part of the filling channel. The weld obtained by a pulsed laser is generally formed from three successive spot welds, in order to increase the safety and the production quality of the closure. The chamfered inlet part of the filling channel is generally known by the term "seal weld".

The weld is carried out under satisfactory condition only if the axis of the laser beam for melting the material of the plug, along the periphery of the chamfered inlet part of the filling channel, is centered accurately with respect to the circular inlet opening of the seal weld and if this circular opening has a diameter the size of which is predetermined and defined very accurately.

Furthermore, after welding, the quality of the spot welds can be inspected, in order to determine whether the fuel rod complies perfectly.

The inlet opening of the filling channel or pressurization hole is positioned manually and with simple visual monitoring, before the welding operation. The mechanical adjustment for manually controlling the positioning of the plug and of the pressurization hole cannot enable the perfect positioning of the pressurization hole to be guaranteed in all cases during welding. There are possibilities of maladjustment or blockage of the rod, which result in poor positioning. In addition, the visual monitoring of the positioning of the filling channel does not make it possible to obtain a highly efficient adjustment either.

The quality of the spot weld is inspected by X-ray scanning. This inspection makes it possible to detect porosities in the weld but does not allow the position and size of the weld to be verified satisfactorily.

Furthermore, the inspection must be carried out on a separate station of the filling apparatus, which makes the rod manufacture operations more complex and longer.

Where the sealing weld is carried out by laser welding, the quality of the laser weld depends on the geometry of the chamfer of the inlet part of the filling channel; in particular, it is necessary to verify that the chamfer has an inlet opening whose diameter, which constitutes the maximum diameter of the chamfer, complies with extremely strict size requirements.

SUMMARY

The aim of the invention is therefore to propose a method of inspecting an operation of sealed closure by welding an end opening of a filling channel axially traversing an upper plug for closing the cladding of a fuel rod for a nuclear reactor, the cladding of the rod containing a plurality of pellets of nuclear fuel stacked in the axial direction of the cladding and two closure plugs, one of the plugs or the upper plug being traversed axially by the channel for filling the cladding of the rod with an inert gas and the sealed closure by welding of the filling channel of the upper plug being carried out after filling the cladding with inert gas, in a filling apparatus, by melting central part of the end of the upper plug adjacent to the opening of the filling channel, this method allowing for inspection of the conditions for implementing and carrying out the sealed closure of the upper plug by welding, efficiently and without extending the time needed for the manufacture of the fuel rod.

With this aim, prior to the sealed closure of the filling channel, the fuel rod being in the position for filling and for sealed welding of the upper plug in the filling apparatus, images are acquired of the end of the plug on which the substantially circular inlet opening of the filling channel emerges, and in order to obtain a digitized image, the position of the center of the circular inlet opening of the filling channel is determined with respect to a reference position and the diameter of the inlet opening of the filling channel by analyzing the digitized image. It is thereby deduced whether it is possible to weld the filling channel. Where the sealed closure of the filling channel is carried out by welding, images are acquired of the end of the upper plug after welding and the presence and the position of a weld for sealed closure of the filling channel are determined.

BRIEF DESCRIPTION OF THE DRAWINGS

In order for the invention to be properly understood, the implementation of the inspection method according to the invention will now be described, by way of example, with reference to the appended figures, in the case where the filling channel of an upper plug of a fuel rod is sealed shut by laser welding.

FIG. 1 is a view in partial axial section of the upper end of a fuel rod, in a manufacturing phase before it is filled with inert gas and the upper plug is sealed shut.

FIG. 2 is a view in partial axial section similar to the view of FIG. 1 illustrating the upper end part of the rod after the upper plug is sealed shut by welding.

FIG. 8 is an example of an image appearing on the screen of the inspection device on implementing the method according to the invention before welding the filling channel of the upper plug of a rod.

FIG. 9 is an explanatory image illustrating the successive search operations carried out on implementing the method according to the invention, after welding the filling channel of the upper plug of a fuel rod.

DETAILED DESCRIPTION

Figure 3:
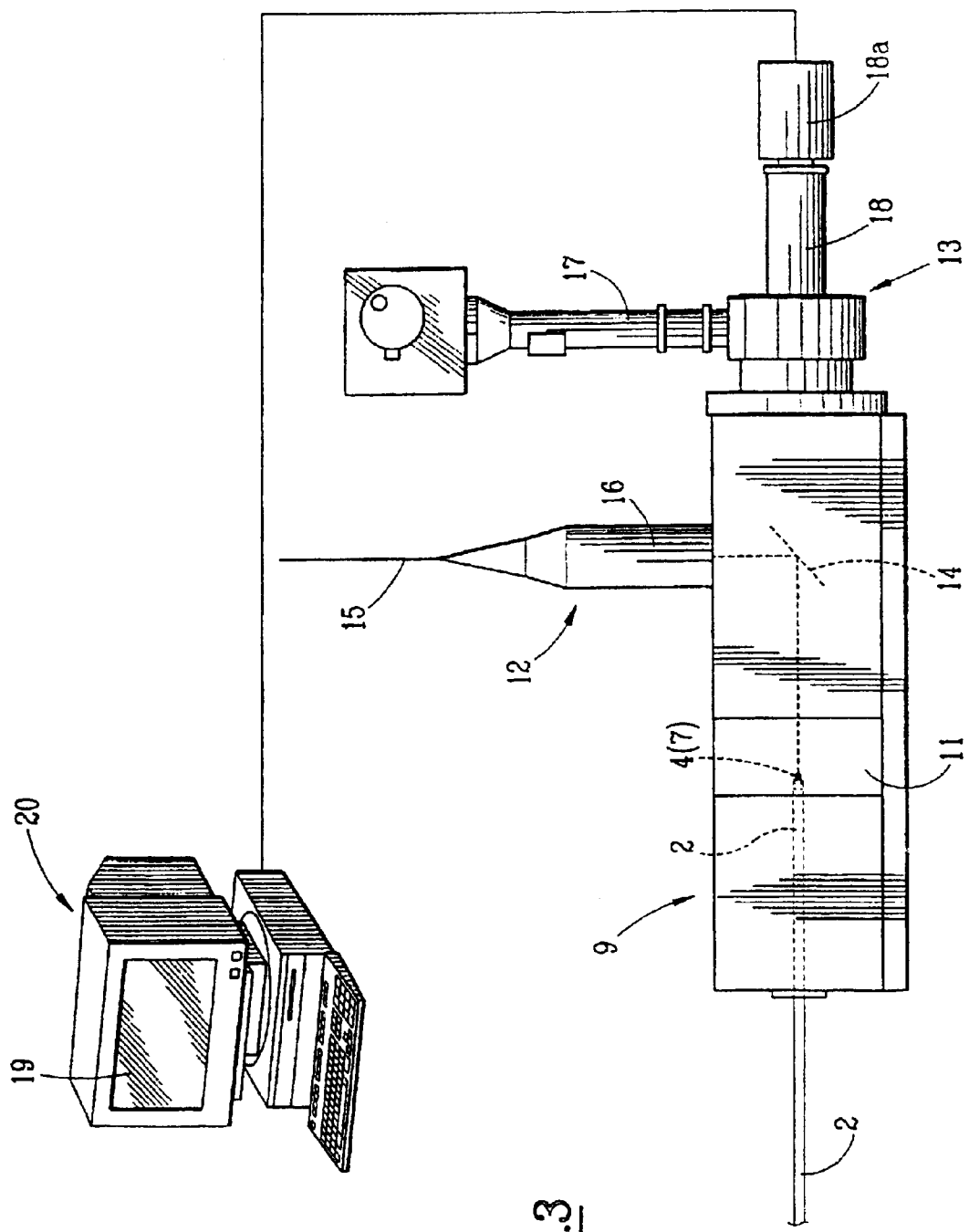
FIG. 3 is a schematic view of a station for filling with inert gas and for the sealed closure by laser welding of the upper plug of fuel rods and of a device for inspecting the weld of the upper plugs of the fuel rods.

The upper end part of a fuel rod for a pressurized-water nuclear reactor, denoted generally by the reference 1, is illustrated in FIG. 1 and in FIG. 2.

The rod 1 comprises, in particular, tubular cladding 2 made of zirconium alloy which contain fuel pellets 3 and which is closed at its upper end, represented in FIG. 1 by a plug 4 constituting the upper plug of the fuel rod.

The plug 4 is generally made up of zirconium alloy and comprises a part 4a which is engaged, virtually without clearance, in the end part of the bore 2. After filling the cladding 2 with fuel pellets 3, the closure plugs of the cladding, such as the upper plug 4, are engaged in the end parts of the cladding, the sealed attachment of the plug being provided by a weld line such as 5 made by melting the material of the plug and of the cladding, along a circular line.

A spring for holding the fuel pellets is inserted between the upper plug 4 and the end of the column of fuel pellets 3.

The upper plug 4, which is axisymmetric about an axis 6, comprises an end part 4b opposite, in the direction of the axis 6, to an end 4a engaged in a coaxial arrangement inside the cladding 2. The outside of the end part 4b of the plug 4 has, successively in the axial direction 5, from the upper end of the plug, a frustoconical plug, a shoulder and a cylindrical part along which the diameter of the plug is at a minimum. The minimum-diameter part of the plug and the shoulder make it possible to engage and to fasten the jaws of a gripper tool, during fuel rod maintenance operations.

The plug 4 is traversed, in the direction of the axis 6, along a whole length, by a channel 7 which will be denoted subsequently as a filling channel, this channel 7 making it possible to fill the cladding of the rod with an inert pressurized gas, as will be explained below. The filling channel 7 of the plug 4 comprises several successive parts, the diameters of which generally decrease from the end 4a of the plug engaged in the cladding 2 to the outer end part 4b of the plug.

At an upper end or outer end, the channel 7 comprises a terminal part 7a of frustoconical shape or a seal weld flared from the bottom upwards, i.e. from the inside to the outside of the plug, which emerges on the upper end surface 8 of the plug along a circular inlet opening, the center of which is on the axis 6 common to the plug and the cladding 2.

The seal weld 7a of the channel 7, along which the channel 7 is closed by a weld, provides the junction between a part 7b of the channel 7 of minimum cross section and the circular inlet opening of the channel 7 on the upper end surface 8 of the plug 4.

The small-diameter part 7b may have a diameter of about 0.6 mm and the circular inlet opening of the terminal frustoconical part 7a a diameter of about 1.3 mm.

As illustrated in FIG. 2, after having filled the cladding of the rod with an inert pressurized gas, such as helium, the channel 7 is sealed shut in its upper terminal part, by a weld 10 obtained by melting the material of the plug in the central region of its upper end part, at the periphery of the seal weld 7a and consisting, for example, of three laser spot welds.

In FIG. 3, the upper plug 4 of the fuel rod 2 is filled and sealed in a filling and welding apparatus 9.

The filling and welding apparatus mainly comprises a enclosure, one wall of which comprises an opening for the passage of a fuel rod 2 in a horizontal arrangement, the upper end of the rod being inserted into the enclosure, so that the upper plug 4 of the fuel rod 2 engages with a valve 11, the closure member of which makes it possible to close or to open the terminal end of the filling channel of the plug.

The enclosure of the filling and welding apparatus 9 comprises a part located opposite the part for introducing the rod 2, on the walls of which are mounted a laser beam welding device 12 and an optical assembly 13 making it possible to position the laser beam in order to weld the sealed closure of the filling channel of the upper plug 4 of the fuel rod 2 and which is also used to implement the inspection method by analyzing the optical image according to the invention.

A mirror 14 for reflecting and focusing the laser welding beam emitted by the laser welding device 12 is placed inside the second part of the enclosure 9. The device 12 comprises an optical fiber 15 connected to a laser source and a collimator 16, so as to send, by the reflection and focusing mirror 14, a laser beam of axial direction, on the end part of the filling channel 7 constituting the seal weld.

To allow a sealed closure of the filling channel by a weld 10 under satisfactory conditions, the laser beam may be directed accurately onto the center of the circular inlet opening of the filling channel 7 of the upper plug 4. In order to adjust the position of the laser welding beam, the optical illumination and adjustment assembly 13, which comprises an illumination device 17 and an optical sighting assembly comprising a reticule, is used so as to identify the direction along which the laser shot is sent.

In the case of methods of adjusting the welding according to the prior art, adjusting the position of the upper plug of the rod is carried out manually and verified visually.

In the case of the method according to the invention, the illumination device 17 for sighting and adjusting the laser shot is used in order to inspect, on digitized images, the position of the center of the inlet opening of the filling channel with respect to the laser beam and the compliance of the inlet opening, in order to determine whether the welding of the filling channel, after the rod is filled with pressurized helium, can be carried out satisfactorily.

The weld, consisting of spot welds, is also inspected by analysis of digital images.

For this purpose, a digital camera 18a connected to a microcomputer 20 comprising a screen for displaying images 19 is combined with an optic 18 directed in the axis of the enclosure 9 along which the fuel rod 2 is engaged. The microcomputer 20 comprises a video acquisition card and a digital input/output card enabling the microcomputer 20 to communicate with a controller managing the laser welding device 12.

The microcomputer 20 receives inspection orders from the controller, via the digital input/output card, and verdicts established from the results of the inspection are sent by the microcomputer 20 to the controller for controlling the laser welding device 12. Information relating to the rod and the welding conditions is transmitted to the microcomputer 20 by the controller of the laser welding device 12.

A first step of the method for inspecting the sealed closure by welding the filling channel of the upper plug of a rod is in determining the position and the size, i.e. the diameter of the inlet opening 8a of the filling channel 7, consisting of the circular outline along which the filling channel 7 opens on the end surface 8 of the upper plug 4 of the rod. This inlet opening constitutes the large diameter end of the chamfer of the terminal part 7a of the filling channel.

The inspection is performed on the filling and welding apparatus as described, during a phase in the course of which the fuel rod is filled with pressurized helium, the valve 11 being open.

An image is acquired of the end surface 8 of the plug and of the inlet opening 8a of the terminal part 7a of the filling channel using the optic 18 and the digital camera 18a, the optical image obtained being digitized by the digital camera 18a and transmitted in digital form to the inspection microcomputer 20.

Figure 6:
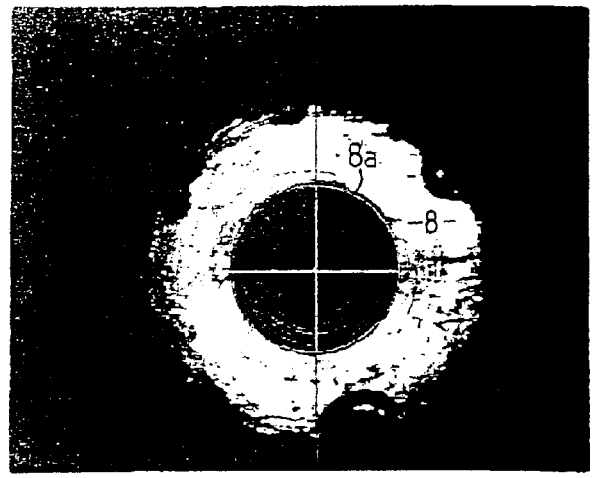
FIG. 6 is an example of an image appearing on the screen of the inspection device on implementing the method according to the invention before welding the filling channel of the upper plug of a rod.
Figure 7:
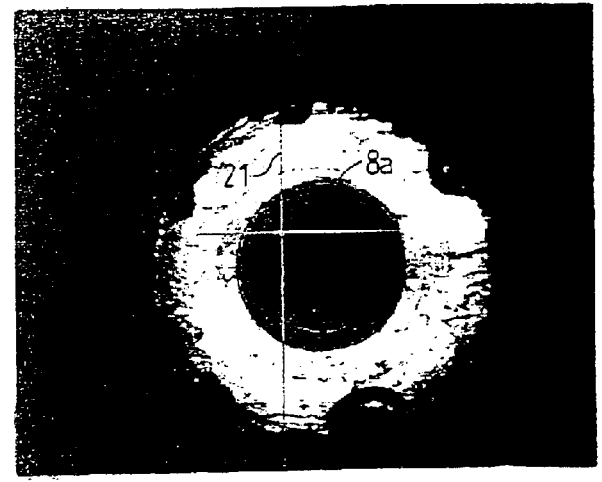
FIG. 7 is an example of an image appearing on the screen of the inspection device on implementing the method according to the invention before welding the filling channel of the upper plug of a rod.

The image obtained may be made visible on the screen 19 of the microcomputer 20, as shown, for example, in FIGS. 6, 7 and 8.

Figure 4:
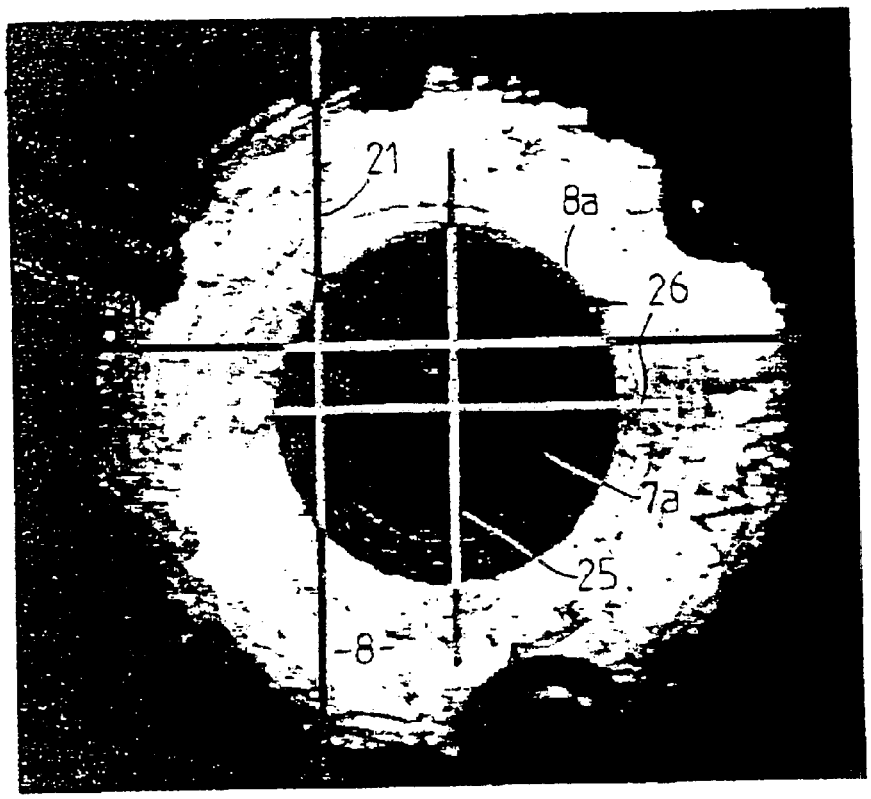
FIG. 4 is a explanatory image illustrating the successive search operations performed before welding in order to implement the method according to the invention.

The search operations performed on the circular opening of the seal weld will be explained with respect to FIG. 4.

As a result of illuminating the end of the upper plug of the rod in an axial direction, the end surface 8 of the rod appears as a light region and the terminal part 7a of the filling channel 7 as a dark region, the light region and the dark region being separated one from the other by a substantially circular line 8a constituting the inlet end of the seal weld.

Analysis of a digital image of the end part of the upper plug allows determination of the position of the center of the circular opening 8a with respect to the center of a parameterizable sighting marker, marking the position of the laser beam with which the closure is sealed by welding the filling channel 7. Ideally, the position of the sighting marker and the position of the center of the inlet opening of the plug should be coincident.

The sighting marker 21 comprises a vertical axis and a horizontal axis which define the center of the sighting marker. It is positioned visually when the laser welding station is correctly adjusted.

The edges of the opening 8a are sought on the image along the horizontal and vertical axes of the reference sighting marker 21.

The edges of the hole 8a are sought along the horizontal axis of the sighting marker 21 or first axis. A number N is chosen, which corresponds to the number of rows of the image which will be used on each side of the reference 21 in order to define a mean row along which the edges of the opening 8a will be sought.

Figure 5:
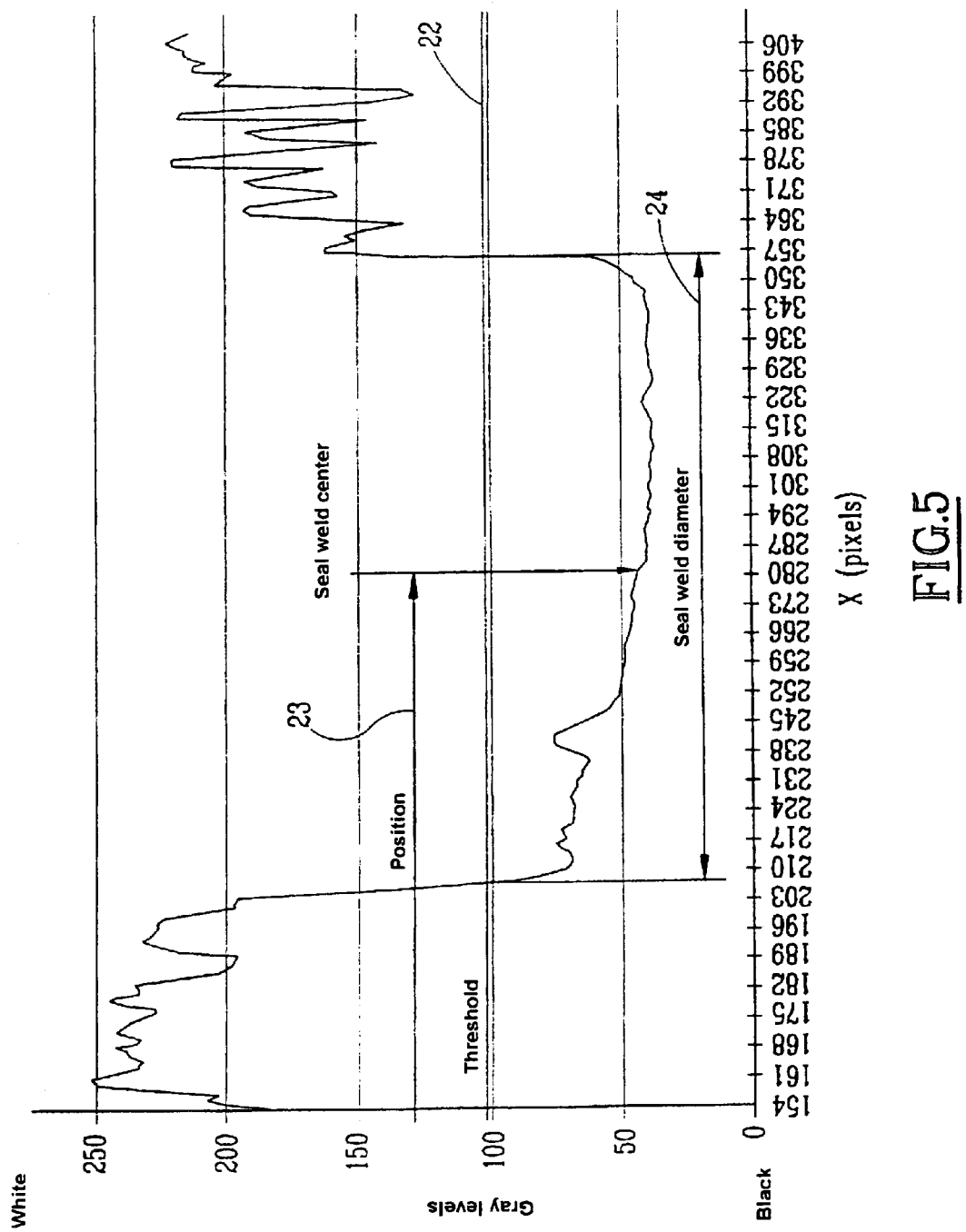
FIG. 5 is a graph illustrating the gray level of points of a column or row of the image which is obtained during the inspection, before welding the filling channel of the upper plug of a fuel rod.

FIG. 5 illustrates the variations of the gray levels between the black and the white, along the mean row determined above. The distances on the X-axis, i.e. along the row of the image, are expressed in image points or pixels.

A parameterized threshold value is chosen.

The threshold value is illustrated by the straight line 22 of FIG. 5.

The right edge of the image then the left edge are determined along the mean row and by comparing the pixels to the threshold value.

From the right edge and from the left edge defined on the graph, the position of the center of the hole of the seal weld is determined, for example with respect to an edge of the image as illustrated by the segment 23 and the diameter of the seal weld as shown by the segment 24. The edges of the hole of the seal weld are then sought along a second axis consisting of the vertical axis 25 (see FIG. 4) passing through the center previously defined or the first center.

The edges of the inlet opening of the seal weld are determined in the same way as above, but using the columns of the image instead of the rows. In this way, a second center of the circular inlet opening and the diameter along the vertical axis are defined.

The edges of the circular inlet opening 8a of the seal weld are then determined, along the horizontal axis 26 or third axis passing through the second center defined by the search on the vertical axis. The position of the center of the circular opening 8a and the diameter of the circular opening along the horizontal axis are deduced therefrom, this third determination of the center of the opening supplying the actual center taken into account.

The values obtained for the diameter along the vertical axis 25 and along the horizontal axis 26 are checked for consistency, that is to say that they do not differ by a value greater than a chosen threshold value.

The pixels are then converted into millimeters and the diameter of the circular opening 8a is compared with threshold values defined by the "minimum diameter and maximum diameter" parameters of the opening 8a.

The position of the center of the circular opening 8a defined by its distance to the center of the sighting marker 21 is compared with a threshold value corresponding to a "tolerance of center position" parameter. The results are displayed on the screen of the microcomputer 20, as shown in FIGS. 6, 7 and 8. In each case, a first value is displayed in millimeters corresponding to the position of the center of the circular opening 8a, a second value is displayed in millimeters corresponding to the diameter of the circular opening 8a and a verdict indicating the compliance or the noncompliance of the measured values is displayed. Where the measured values comply, an execution command is transmitted to the controller of the laser beam welding device 12. Otherwise, a blocking command is transmitted.

In the case of FIG. 6, the values identified comply, the distance between the center of the opening 8a and the center of the sighting marker is less than a chosen threshold value and the diameter measured being between the acceptable minimum diameter and the acceptable maximum diameter.

In FIG. 7, the opening 8a is offset with respect to the center of the sighting marker 21, such that the distance between the center of the opening 8a and the center of the sighting marker is greater than the chosen threshold value. A verdict of noncompliance is therefore transmitted. On the other hand, the diameter in this case is between the maximum and minimum threshold values.

In FIG. 8, the diameter measured on the image of the opening 8a is less than the minimum threshold value. A verdict of noncompliance is transmitted. In addition, the position of the center of the opening 8a is slightly offset with respect to the position of the sighting marker, the distance between the center of the opening 8a and the center of the sighting marker is however less than the threshold value.

A fault verdict is also transmitted when it has not been possible to mark the edges of the opening 8a in the course of the searches as described above.

In the case of a verdict of compliance, a welding execution command is sent to the controller of the laser welding device 12. The welding is performed by the pulsed laser which melts the metal of the upper plug in a peripheral region of the terminal part 7a or seal weld of the filling channel 7. A spot weld is produced closing off the inlet of the small-diameter part 7b of the filling channel 7, then two successive pulses are produced to form the weld 10.

On its upper surface, the weld 10 is in the shape of a dish or crater due to the flow and to the deposition of the metal in the hollow central part of the plug.

After welding, since the fuel weld is in position in the filling and welding apparatus 19, it is possible to inspect for the present and characteristics of the spot welds.

For this purpose, the end surface of the rod 8 is illuminated, using the illumination apparatus 17, thereby sending light in an axial direction onto the surface of the rod, and images are acquired of the end surface 8 of the rod using the optic 8 and the digital camera 8a.

The digitized image is transmitted to the microcomputer 20.

Figure 11:
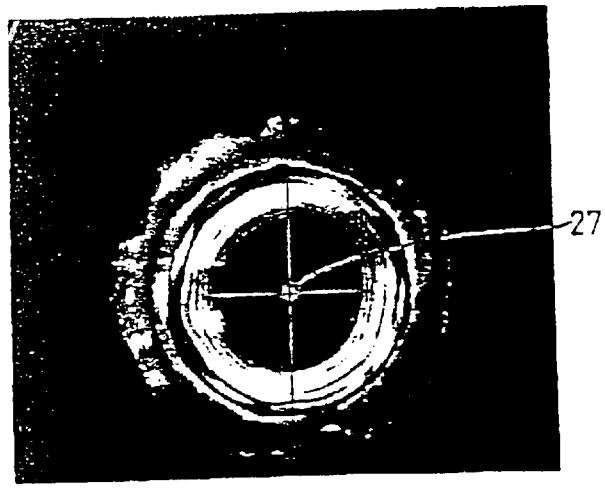
FIG. 11 is an example of an image appearing on the screen of the inspection device, as a result of inspecting the weld of the filling channel of an upper plug of a fuel rod.
Figure 12:
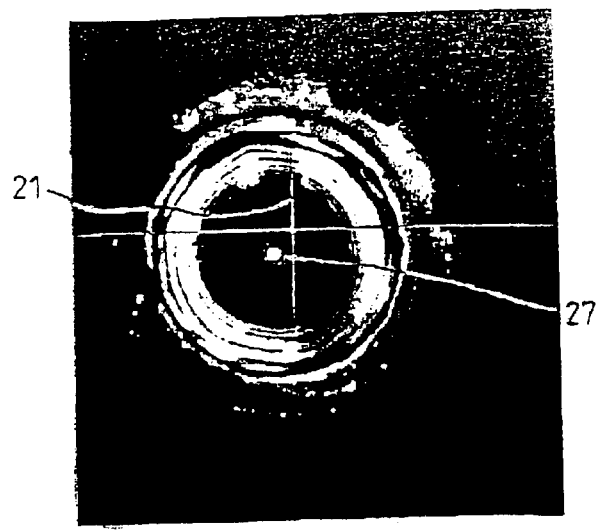
FIG. 12 is an example of an image appearing on the screen of the inspection device, as a result of inspecting the weld of the filling channel of an upper plug of a fuel rod.
Figure 13:
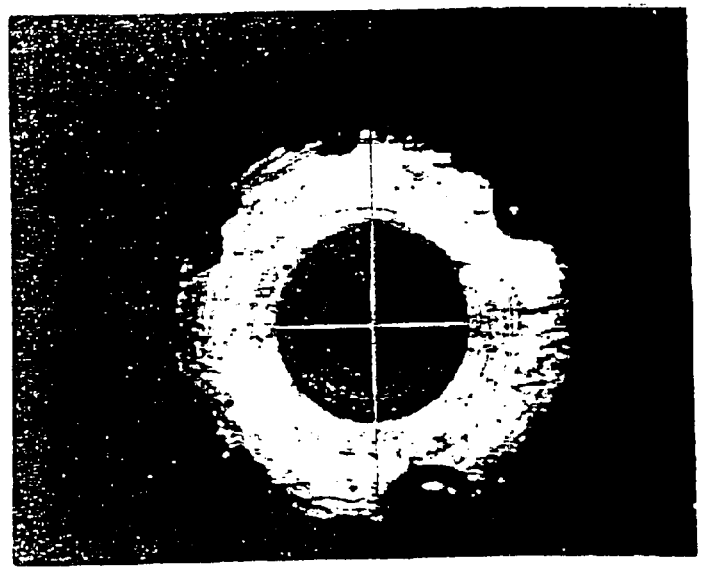
FIG. 13 is an example of an image appearing on the screen of the inspection device, as a result of inspecting the weld of the filling channel of an upper plug of a fuel rod.

The image of the end part of the plug can be displayed on the screen, as illustrated, for example, in FIGS. 11, 12 and 13.

The search operations performed on the spot weld will be explained with respect to FIG. 9.

On the image, the end surface 8 of the plug and the reflection 27 produced by the light reflected by the crater of the central part of the spot weld 10 appear as the light part.

By analyzing the digitized image, the distance from the center of the reflection 27 to the center of the parameterizable sighting marker 21, which is shown on the screen, is determined.

The position of the center of the reflection 27, that is to say the distance from this center to the center of the sighting marker, is compared with a "tolerance of center position" parameter and the diameter of the reflection is compared with threshold values defined by "minimum and maximum diameter" parameters.

The horizontal mean rows are constructed around the reference, then a maximum number of pixels greater than the threshold, and which be positioned in the reflection, are determined.

The edges of the reflection 27 are then determined along a first axis consisting of the horizontal axis passing through the position found above. For this purpose, a mean row is defined, in the way indicated above and a graph is drawn representing the variation of the gray levels along the mean row, as shown in FIG. 10.

Figure 10:
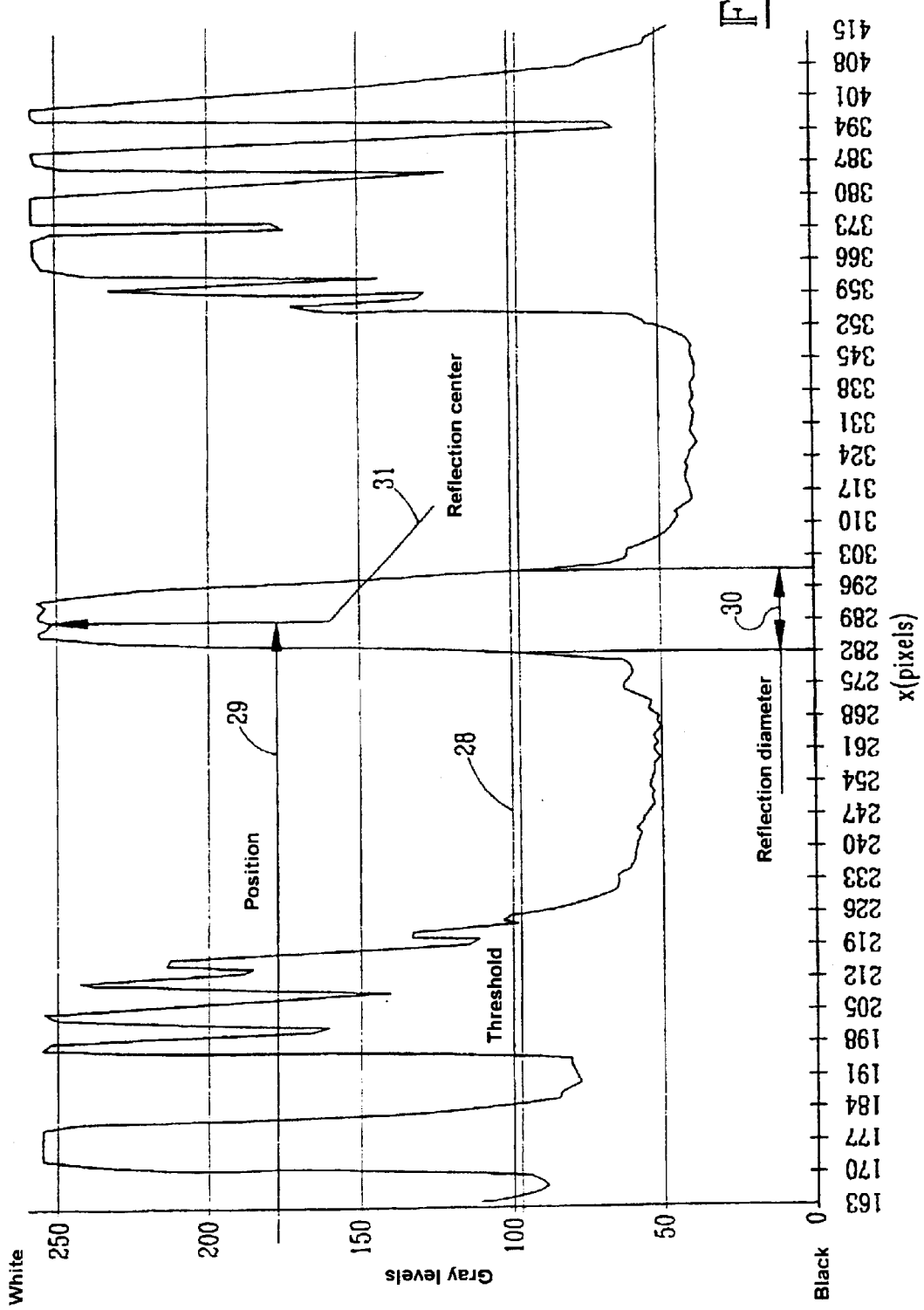
FIG. 10 is a graph illustrating the gray level along a row or a column of the image supplied by the inspection device, after welding the filling channel of the upper plug of a rod.

A threshold value, represented by the horizontal straight line 28 in FIG. 10, is defined.

The right edge and the left edge of the reflection are determined by comparing the successive pixels along the mean row with the threshold value. A first position of the center of the reflection is calculated with respect to an edge of the image, this position being represented by the segment 29 in FIG. 10.

A first diameter of the reflection between the right and left edges is also calculated, this diameter being represented by the segment 30 in FIG. 10.

The edges of the reflection along a second axis consisting of a vertical line passing through the first center defined above are determined by carrying out a search identical to the previous one but on the columns of the image.

The consistency of the values obtained are verified for the diameter of the reflection 27 along the first and second axes.

The pixels are converted into millimeters and the diameter is compared with the "minimum and maximum diameter" threshold values and the position, with the "tolerance of center position" parameter.

The results are displayed on the screen of the microcomputer, as shown in FIGS. 11, 12 and 13.

In each case, one of the items of information displayed in digital form relates to the position and the other to the diameter of the reflection. The position of the reflection corresponds to the distance in millimeters between the center of the reflection and the center of the parameterizable sighting marker forming the reference. The position of the center of the reflection corresponds to the position of the center of the spot weld.

In the case of FIG. 11, both the position and the diameter of the reflection are satisfactory. A verdict of compliance is then displayed.

In the case of FIG. 12, the center of the reflection 27 is offset with respect to the center of the reference 21 by a value greater than the predetermined threshold value.

A verdict of noncompliance is therefore transmitted. However, the diameter of the reflection is satisfactory, that is to say between the minimum admissible value and the maximum admissible value.

In the case of FIG. 13 there is no reflection 27, which results in the absence of the spot weld in the seal weld of the filling channel 7 of the upper plug of the rod. A verdict of noncompliance is transmitted.

In the case where a verdict of compliance is transmitted, the fuel rod may be considered as correctly welded and may be accepted at the end of manufacturing.

The method according to the invention also makes it possible to determine the depth over which the weld has been carried out and, in particular, when only the first spot weld has been carried out, a very small reflection coming from the bottom of the seal weld is observed. In this case, the absence of the second and third spot welds is easily detected from the measurement of the diameter of the reflection.

Examination of the graph giving the gray levels along a reference line passing through the reflection of the spot weld also makes it possible to determine the position of the center of the dish of the spot weld which is denoted by the reference 31 in FIG. 10.

Analysis of the optical images produced by the microcomputer 20 is carried out using software.

The invention makes it possible, in the apparatus for filling and sealing the rod, to inspect the diameter of the opening of the seal weld of the upper plug of the rod and its positioning with respect to the laser welding beam, so as to determine whether or not it is possible to carry out the sealed closure by welding the rod filled with pressurized helium.

Secondly, the invention also makes it possible to verify that the spot weld has been carried out in a compliant manner. All the operations are carried out in parallel on the filling and welding apparatus.

The method according to the invention makes it possible to avoid any operation of maintaining the rods between the filling and sealed closure apparatus and an inspection station and the verdict relating to the compliance of the spot weld is available from the end of the welding operation.

Information relating to the operation as a whole (positioning, welding and inspection) may be saved on a hard disk and can be exploited subsequently in the form of databases.

Finally, the illumination used to acquire images is a standard illumination which can be obtained by market available items.

The invention is not limited strictly to the embodiments which have been described.

It is possible to process the digitized images of the end surface of the upper plug before and after welding, by methods other than those which have been described, for example for determining the edges of the inlet opening of the filling channel and of the reflection of the spot weld.

Finally, the method according to the invention is applicable to any nuclear fuel rod comprising an upper plug traversed by a channel for filling the rod with an inert pressurized gas.

What is claimed is:

1. A method of inspecting an operation of sealed closure by welding an end opening of a filling channel axially traversing an upper plug for closing a cladding of a fuel rod for a nuclear reactor, the cladding of the rod configured to contain a plurality of pellets of nuclear fuel stacked in an axial direction of the cladding and two closure plugs, at least one of the plugs and an upper plug traversed by the channel for filling the cladding of the rod with an inert pressurized gas and the sealed closure by welding of the filling channel of the upper plug after filling the cladding with the inert pressurized gas, in a filling apparatus, by melting an end central part of the plug adjacent to the opening of the filling channel comprising:

prior to the sealed closure of the filling channel, acquiring images of an end surface of the plug on which the filling channel emerges by the substantially circular inlet opening to obtain a digitized image, wherein the rod is in a position for filling and for sealed welding of the upper plug in the filling apparatus and wherein the inlet opening is configured to be substantially circular;

determining a position of a center of the circular inlet opening of the filling channel with respect to a reference position and a diameter of the inlet opening of the filling channel through analyzing the digitized image;

deducing whether it is possible to weld the filling channel; and acquiring images of the end of the plug after welding and determining a presence and position of a spot weld for sealed closure of the filling channel, where the sealed closure of the filling channel is carried out by welding.

2. The method according to claim 1, wherein the reference position consists of a center of a reticule comprising a horizontal axis and a vertical axis, the position of the center of the reticule corresponding to a position for adjusting a welding arrangement for carrying out the sealed closure by welding of the filling channel of the plug, the method further comprising:

seeking the edges of the inlet opening of the filling channel on the end surface of the plug along a first axis of the reticule;

deducing a first position of the center of the circular inlet opening of the filling channel and a first value of the diameter of the inlet opening;

seeking the edges of the opening along a second axis perpendicular to the first axis of the reticule passing through the center deduced position;

deducing a second position of the center of the circular opening of the filling channel and a second value of the diameter of the circular inlet opening of the filling channel;

seeking the edges of the circular opening along a third axis perpendicular to the second axis passing through the second position of the center;

deducing a third position of the center of the circular opening and a third value of the diameter of the circular opening, the third position of the circular opening considered as an actual center of the opening;

comparing the second value of the diameter and the third value of the diameter to deduce a consistency of the second and the third parameter values considered as parameters of the circular opening;

determining a distance between the third position of the center of the opening and the center of the reticule; and comparing the distance calculated between the centers of the circular opening and of the reticule together with the calculated value of the diameter of the circular inlet opening of the filling channel to threshold values to determine a compliance of the inlet opening of the filling channel and of a filling channel position and a possibility of carrying out sealed closure by welding.

3. The method according to claim 2, wherein the edges of the inlet opening of the filling channel are sought along each of the axes from a graph providing gray levels along at least one of the mean gray levels along N rows and N columns of the digitized image parallel to the axis along which a search is carried out and which are located on each side of the axis.

4. The method according to claim 3, wherein the edges of the circular inlet opening of the filling channel are determined by using a threshold value of the gray levels constituting a mean between the gray levels of the image of the filling channel and the gray levels of the surface of the upper plug around the circular inlet opening of the filling channel.

5. The method according to claim 1, wherein a reflection of the spot weld, having a central part in the shape of a crater reflecting light directed axially is sought on the digitized image of the end surface of the plug after carrying out the sealed closure of the filling channel of the upper plug, and determining a position of the center and the size of the reflection.

6. The method according to claim 5, wherein the position of the center of the reflection is determined with respect to a center of a reticule defined by two horizontal and vertical axes, respectively, on the digitized image, corresponding to a welding position and a diameter of the reflection, and in that the distance from the center of the reflection to the center of the reticule and a calculated diameter of the reflection are compared to threshold values to define whether the upper plug of the fuel rod is compliant after welding.

7. The method according to claim 6, further comprising:

seeking the edges of the reflection along a first axis of the reticule;

deducing a first position of the center and a first value of the diameter of the reflection;

seeking the edges of the reflection along a second axis perpendicular to the first axis passing through the first center of the reflection;

deducing a second position of the center and a second value of the diameter of the reflection;

comparing the first and second diameters in order to verify a consistency of the values obtained;

determining a distance between the second position of the center of the reflection and the center of the reticule; and comparing a distance between the center of the reflection and the center of the reticule and the calculated diameter of the reflection to threshold values to determine a compliance of carrying out the sealed closure by welding the filling channel of the upper plug of the rod.

8. The method according to claim 7, wherein the edges of the reflection are sought along each of the first and second axes by determining a graph providing grey levels along a mean row parallel to the first and second axes respectively, corresponding to a mean of the gray levels along at least one of several rows and columns of the digitized image which are parallel to one of the first and second axes respectively and placed on each side of one of the first and second axes.

* * * * *